Patented Nov. 14, 1944

2,362,906

UNITED STATES PATENT OFFICE 2,362,906

PROCESS OF RECOVERING CITRIC ACID VALUES FROM CITRUS PRODUCTS

Herbert T. Leo and Clarence C. Taylor, Anaheim, Calif., assignors to Mutual Citrus Products Company, Anaheim, Calif., a corporation of California No Drawing. Application February 25, 1943, Serial No. 477,166

10 Claims. (Cl. 260—535)

This invention relates to a process of recovering citric acid values from citrus products, such as limes and lemons. More particularly, the invention relates to the recovery of a white calcium citrate of high purity and substantially free of extraneous organic substances from the juices of limes and lemons.

Heretofore, in the preparation of calcium citrate or citric acid from citrus fruit juices, it has been the practice to centrifuge the juice to remove as much pulp as possible and to obtain a juice testing from about 4 to 5.5% of citric acid. To this juice was added calcium carbonate and/or hydrated lime until the pH was well over 7. The entire volume was then heated to a full boil until all of the calcium citrate and organic matter was precipitated. The mass was then run through filters and the filtrate run to waste.

The filter cake so obtained contained the calcium citrate and all of the cellulosic organic matter left behind in the juice after centrifuging. The percentage of such organic matter was not very high, but it was sufficient to make the final product distinctly yellow. When dry, the product was never white. Solutions of this calcium citrate in hydrochloric acid were a light coffee color, and so were the citric acid solutions recovered therefrom by treatment with sulfuric acid to remove the calcium as calcium sulfate, or gypsum. When such solutions were concentrated in vacuum, they became very dark in color, due entirely to the foreign organic substances present in the calcium citrate as originally precipitated.

In contrast to such a product, the calcium citrate recovered in accordance with the process of our invention, and also the citric acid obtainable therefrom, are perfectly white and substantially free from any extraneous organic matter.

In our process, we do not first remove the organic matter, as by centrifuging, because it is highly desirous to have as much organic matter present as possible at the time the fruit juices are neutralized with hydrated lime and calcium carbonate. Furthermore, it is desirable to have present in the juices those enzymes that coagulate soluble pectin bodies in the presence of lime. It is the resulting bulk of fruit pulp, produced upon coagulation with lime, that forms the filter base in our process and that makes possible such a brilliant filtrate as we obtain.

According to our process also the juice obtained from the squeezing of the citrus fruit is adjusted to a concentration of citric acid at which, upon conversion of the citric acid into calcium citrate and filtering, the calcium citrate will remain dissolved in the filtrate, with the pH of the filtrate kept at 7 or only slightly above 7 and the temperature kept around usual room temperature. This concentration has been found to be about 2.5 to 2.75% of citric acid in the juices at the time of treatment with hydrated lime and calcium carbonate. This provision prevents any losses of calcium citrate due to precipitation with the organic material.

After the conversion of the citric acid into calcium citrate and the filtration to remove organic matter, the clear filtrate containing the dissolved calcium citrate is then heated to a temperature at which the solubility of the calcium citrate becomes substantially lessened, and precipitation of calcium citrate occurs. This temperature, in general, starts around 130° F. and may be from 130° F. up to the boiling point of the filtrate. At 212° F. the solubility of calcium citrate in the filtrate produced by our process is so very low that the loss due to such solubility is correspondingly small, only about 2½%. Compared with the high quality of the calcium citrate produced by our process, this loss is surprisingly low.

It is therefore an important object of this invention to provide a novel and improved process for the recovery of the citric acid values from the juices of citrus fruits in the form of pure white calcium citrate or citric acid substantially free from extraneous foreign organic matter.

It is a further important object of this invention to provide a process for the recovery of calcium citrate from citrus fruit juices in accordance with which the original juices are adjusted to a citric acid concentration and pH at which the citric acid is converted into calcium citrate which remains in solution while organic matter present is rendered insoluble and can be readily filtered off to give a clear, brilliant solution of calcium citrate from which pure, white calcium citrate or citric acid can be recovered.

It is a further important object of this invention to provide a process for the recovery of calcium citrate from citrus fruit juices wherein the citric acid content thereof is converted into calcium citrate which is kept in solution while the foreign organic matter is rendered insoluble and separated from the calcium citrate solution by filtration after which the filtrate is heated to precipitate out a pure, white calcium citrate.

Other and further important objects of this invention will become apparent from the following description and appended claims.

The process of our present invention can probably best be described in connection with the preliminary steps of preparing pectin from citrus fruits, although it is to be understood that our invention is not necessarily tied up with a pectin making process.

In the process of making pectin from citrus fruits, the juice and oil are, for the most part, extracted as completely as possible. The extent of the extraction may run as high as 95%, or as low as 75% of the extractable juices, depending upon the method employed. Any juice or oil remaining in the peel is usually lost in the subsequent treatment of the peel if the usual prior processes are employed. However, when pectin is made from the peel by the process disclosed in our copending application Serial No. 476,626, filed Feb. 20, 1943, it is not only desirable, but it is necessary to wash the peel as free of citric acid as possible. To do this properly, the peel is ground very fine in a swing hammer mill and large volumes of water are used during the grinding operation. The mixture of water and ground peel is then passed through a screening medium, such as a revolving reel of very fine perforations, and the fruit pulp is freed from most of the liquid. This liquid, or waste water as it is considered in pectin making processes, carries with it fine particles of fruit pulp and fruit sacs, enzymes, glucosides, citric acid, sugars and other water solubles, including some pectins.

We have now found that when this waste water is treated with chalk (calcium carbonate) and hydrated lime, or with hydrated lime alone, to bring its pH above 7.0, the organic materials are hardened and coagulated. Some of this is due to the action of pectinic acid enzymes, which bring about a precipitation of pectin in the presence of lime or calcium. At any rate, the organic materials separate from the liquid portion to such an extent that filtration without filter aids is very easily accomplished in any type of filter press, or in a continuous Oliver type of filter. The filtrate is very clear and free from colloidal materials.

The color of the filtrate varies according to the pH. At a pH of 7.0 it has a greenish cast, while at a pH of 11.0 is decidedly deep orange-red. As the pH rises from 7.0 to 11.0, the odor becomes more characteristically alkaline-organic.

In accordance with our present invention, the above cleaning and filtration operations are carried out at usual room temperatures, and preferably below 100° F., because when higher temperatures are resorted to much of the calcium citrate present will precipitate with the organic matter. We have found that in the treatment of these citrus waste waters that if the citric acid in solution does not exceed 2.75%, all of the citric acid will remain in solution as calcium citrate after the organic material has been filtered out, provided the temperature is below about 100° F. and the pH is at least 7.0 but not substantially above that figure. This concentration of 2.75% of citric acid is equivalent to 104 grams of citric acid per gallon, the citric acid, however, being present at this point in the process as calcium citrate. By the process of our invention, as hereinafter more fully described, we are able to obtain a yield of 141 grams of calcium citrate from each gallon of this solution.

Since the control of conditions under which our process is carried out has a great effect upon the final product, we shall now describe the preferred method of recovering the calcium citrate from the waste water referred to above. As previously stated, if maximum yields are to obtain, it is desirable to have the citric acid content of the waste waters to be treated very close to 2.75% by weight. An analysis for citric acid content is therefore first made. The analyses referred to herein are the results obtained by titration of the waste waters with caustic soda (NaOH) of a suitable normality using phenolphthalein as the indicator. The total acidity is calculated as citric acid. When treating waste waters having a citric acid content less than 2.75%, and some of the waste waters may run as low as 0.4% of citric acid, the citric acid content should be brought up to 2.75% or thereabouts by adding lemon or lime juice from fruits previously pressed out.

Starting, then, with a waste water, or liquid, containing approximately 2.75% of citric acid, the waste water is placed in an agitator tank and a water suspension of chalk and hydrated lime is added gradually until a pH of exactly 7.0 is reached. Since lime and chalk are both relatively insoluble in water, it takes some time to reach this pH of 7.0, and, if care is not exercised, there is considerable danger of passing it. Should the neutral point be substantially exceeded, say, beyond 7.6, more citrus fruit juice must be added. The amount of chalk and hydrated lime usually exceeds the calculated amount necessary to convert the citric acid into calcium citrate. This is perhaps due to the fact that some of the lime combines with organic matter present. There may be as much as ten per cent more hydrated lime required than the amount calculated to convert the citric acid into calcium citrate.

The pH of the liquid after the addition of chalk and hydrated lime, need not be exactly 7.0, but it should be at least that high. At pH values up to 7.6, a satisfactory precipitate of the organic matter is obtained, but at pH values beyond this figure, the characteristics of the recovered calcium citrate are not so satisfactory and the yields of calcium citrate are materially reduced. For practical operating purposes, therefore, the pH should be maintained at between 7.0 and 7.6 at the completion of the addition of hydrated lime, or of chalk and hydrated lime.

When the precipitate of the organic matter is firm enough, the mass is filtered through any suitable filtering medium, such as a press filter. The cake that remains upon the filter medium is largely organic matter, while the clear filtrate obtained contains the calcium citrate in solution. The filter cake can be washed with fresh water to reduce losses of calcium citrate, but ordinarily this is not worthwhile.

The clear filtrate, obtained from the foregoing filtering steps and having a pH, preferably, of 7.0, is next heated. As the temperature reaches 130° F., there is a distinct showing of crystals of calcium citrate, and with increasing temperature above that point, the calcium citrate continues to crystallize out in increasing amounts right up to the boiling point. The mass is next filtered to recover the calcium citrate, which remains upon the filter medium. The filtrate may be run to waste. By washing the calcium citrate on the filter medium with either cold or hot water, it may be completely freed of any adhering dark filtrate.

The following example will serve to illustrate a preferred embodiment of our invention, in which definite figures as to quantities and volumes are given:

*Example*

One ton of lemons is squeezed to produce 80 gallons of juice having a citric acid content of 6% by weight. Since, for the efficient operation of our process, an aqueous solution containing not over 2.7% of citric acid by weight should be used, this juice of 6% citric acid content must be diluted to 170 gallons by the addition of 90 gallons of water. This amount of water can be obtained from the washing of the fine peel with water before the peel is further processed in the manufacture of pectin. The amount of citric acid added with this wash water can be disregarded, so that the citric acid content can be figured as 6% by weight of the 80 gallons of juice originally obtained from the ton of lemons. This calculates out as 40.44 pounds of citric acid, equivalent to 54 pounds of calcium citrate. This amount of calcium citrate is that which can theoretically be recovered from the filtrate. Computed back to the starting volume of 170 gallons, this would be the equivalent of about 3.8% of citric acid by weight, calculated as calcium citrate. While this is the optimum concentration of equivalent calcium citrate in the starting liquid, it is nevertheless profitable to treat liquids for the recovery of calcium citrate by our process, where the liquids are waste products, that have a citric acid content as low as 0.5%. By the use of heat exchangers, heat is conserved and the losses are greatly reduced.

To the 170 gallons of liquid containing about 2.7% of citric acid by weight, contained in a tank provided with efficient agitation, there is gradually added a water suspension of chalk and hydrated lime until a pH of exactly 7.0 is reached. Agitation is continued until a sample of precipitated organic matter exhibits a sufficient firmness to facilitate filtering. The mass is then filtered and the clear filtrate recovered. Up to this point, the operations have been carried out at normal room temperatures, or at least below about 100° F.

The clear filtrate is next placed in a vessel provided with heating means, preferably a steam jacketed crystallizing kettle, and the temperature of the filtrate is raised to approximately the boiling point of the solution. A very distinct formation of crystals of calcium citrate may be observed by the time the temperature reaches 130° F., and thereafter crystallization proceeds to an increasing extent up to the boiling point. It is not necessary to prolong the heating at the boiling point so as to effect any appreciable evaporation of the water content, nor is it desirable if calcium citrate of the highest purity is to be obtained.

The contents of the crystallizing vessel are next filtered to recover the calcium citrate crystals, the filtrate being run to waste. The crystals are washed on the filter with a small quantity of cold fresh water to free them from any adhering portions of the mother liquor.

The calcium citrate so prepared is in the form of white crystals of high purity. This product can be used without further treatment, other than grinding, for many purposes, as for instance in dentrifices as a dental polish. Or, if it is desired to convert the calcium citrate into pure citric acid, the calcium citrate may be suspended in water and sulfuric acid added to precipitate the calcium sulphate, gypsum, which may be filtered out to give a brilliant, colorless solution of citric acid. The citric acid may be recovered from this filtrate by crystallization, or in any other suitable manner.

In addition to affording an excellent process for the recovery of high grade, refined calcium citrate, we may also obtain, as a by-product, organic matter suitable for use as fertilizer. The organic matter filtered out in the first filtration step after neutralization of the waste waters with lime, or with lime and calcium carbonate, has been found to make excellent humus for soil treatment in most of the Southwestern States, or in any locality where the soil lacks humus. Our process thus eliminates the sewage problem that generally accompanies the industrial processing of fruits.

As will be apparent from the above description, the phenomenon on which our process is based is the much greater solubility of calcium citrate at lower temperatures than at higher temperatures, when the calcium citrate is present in an aqueous solution adjusted by means of hydrated lime and chalk to a pH close to the neutral point, or between 7.0 and about 7.6. Calcium citrate is normally soluble to the extent of 3.6 grams per gallon of water. We have found, however, under the conditions of our process, that there is such a vast difference in the solubility of the calcium citrate at normal room temperatures as compared with its solubility at a temperature between 200° and 212° F. that 141 grams per gallon can be recovered by crystallization from solution at the higher temperatures. This indicates an increased solubility of about 39 times the solubility of calcium citrate that would be found at a normal room temperature of say 68° F. in pure water. This tremendous increase in the solubility of calcium citrate at low temperatures under the conditions obtaining in our process is not understood by us. Neither is the greatly decreased solubility of the calcium citrate at boiling temperatures understandable, since the handbooks show that calcium citrate is only slightly less soluble at temperatures around the boiling point than it is at ordinary room temperatures. While we do not understand the cause of this phenomenon, we do believe that it is this peculiar phenomenon that makes it possible, in accordance with our process, to separate from citrus fruit juices or waste waters containing citric acid, a beautiful snow-white calcium citrate, almost completely free from foreign matter and capable of dissolving in an aqueous hydrochloric acid solution to a water white solution. Pure citric acid can be recovered by precipitating the calcium as sulphate with sulfuric acid, from a suspension of the calcium citrate in water.

We claim as our invention:

1. The process of recovering calcium citrate from a dilute acid aqueous solution containing not over about 2.75% of citric acid, which comprises adding to said solution at temperatures below 100° F. an alkaline reacting calcium compound to bring said solution to a pH between about 7.0 and 7.6, filtering to remove any insoluble matters present, heating the resulting filtrate until precipitation of calcium citrate occurs, and recovering said calcium citrate.

2. The process of recovering calcium citrate from a dilute acid aqueous solution containing about 2.5 to 2.75% of citric acid and organic matter derived from citrus fruits, which comprises adding to said solution at a temperature below 100° F. lime and calcium carbonate to bring the pH thereof to at least 7 but not substantially more than 7.6, filtering to remove insoluble organic matter, and recovering calcium citrate from the resulting filtrate.

3. The process of recovering calcium citrate from a dilute acid aqueous solution containing about 2.5 to 2.75% of citric acid and organic matter derived from citrus fruits, which comprises adding to said solution at a temperature below 100° F. lime and calcium carbonate to bring the pH thereof to at least 7 but not substantially more than 7.6, filtering to remove insoluble organic matter, and heating the resulting filtrate to at least 130° F. to effect a precipitation of calcium citrate therefrom.

4. In a process of recovering citric acid values from an acid aqueous solution of citric acid and organic matter derived from citrus products, the step of maintaining the citric acid content of said solution between 2.5 and 2.75%, and treating said solution below 100° F. with an alkaline reacting calcium compound to convert said citric acid into calcium citrate soluble below 100° F. and to precipitate organic matter from said solution.

5. In a process of recovering citric acid values from an acid aqueous solution of citric acid and organic matter derived from citrus products, the step of maintaining the citric acid content of said solution between 2.5 and 2.75%, and treating said solution below 100° F. with lime and calcium carbonate until the pH thereof is at least 7 but not in excess of 7.6 to convert said citric acid into calcium citrate soluble below 100° F. and to precipitate organic matter from said solution.

6. The process of recovering citric acid as calcium citrate from citrus fruit juices containing dissolved organic matter, which comprises adjusting the concentration of said juices to produce a solution having a citric acid content of about 2.5 to 2.75, adding lime and calcium carbonate to said solution to bring the same to a pH of between 7 and 7.6, filtering said solution to remove any insoluble organic matter, heating the resulting filtrate to at least 130° F. to effect a precipitation of calcium citrate, and recovering said calcium citrate.

7. The process of recovering citric acid as calcium citrate from citrus fruit juices containing dissolved organic matter, which comprises adjusting the concentration of said juices at a temperature below 100° F. to produce a solution having a citric acid content of about 2.5 to 2.75, adding lime and calcium carbonate to said solution to bring the same to a pH of 7.0 to 7.6, filtering said solution to remove any insoluble organic matter, heating the resulting filtrate to at least 130° F. to effect a precipitation of calcium citrate, and recovering said calcium citrate.

8. The method of preparing white calcium citrate of high purity and substantially free from extraneous organic substances which comprises providing a citrus juice selected from the group consisting of lemon juice and lime juice, diluting said juice with water to reduce the citric acid content to between 2.50 and 2.75%, adjusting the pH of the diluted juice to a value of from 7 to 7.6 by the addition of an alkaline reacting calcium compound, thereafter filtering the diluted solution to remove insoluble organic matter, heating the resulting filtrate at least to 130° F. to effect a precipitation of calcium citrate, and recovering the precipitated calcium citrate.

9. The method of preparing white calcium citrate of high purity and substantially free from extraneous organic substances which comprises providing a citrus juice selected from the group consisting of lemon juice and lime juice, diluting said juice with water to reduce the citric acid content to between 2.50 and 2.75%, adjusting the pH of the diluted juice to a value of from 7 to 7.6 by the addition of lime and calcium carbonate, thereafter filtering the diluted solution to remove insoluble organic matter, said juice being maintained at a temperature below 100° F. up to and including said filtration, heating the resulting filtrate at least to 130° F. to effect a precipitation of calcium citrate, and recovering the precipitated calcium citrate.

10. The method of preparing calcium citrate which comprises providing an aqueous citric acid solution having a concentration of from 2.5 to 2.75%, adjusting the pH of said solution to a value of from 7 to 7.6 by the addition of an alkaline reacting calcium compound, heating the solution at least to 130° F. to effect a precipitation of calcium citrate, and recovering the precipitated calcium citrate.

HERBERT T. LEO.
CLARENCE C. TAYLOR.